(12) United States Patent
Upton

(10) Patent No.: US 7,434,994 B2
(45) Date of Patent: Oct. 14, 2008

(54) SYSTEMS, METHODS AND APPARATUS FOR A LATCHLESS X-RAY DETECTOR BIN

(75) Inventor: Bayne Robin Upton, Franklin, WI (US)

(73) Assignee: General Electric Company, Schenectady, NY (US)

(*) Notice: Subject to any disclaimer, the term of this patent is extended or adjusted under 35 U.S.C. 154(b) by 35 days.

(21) Appl. No.: 11/467,400

(22) Filed: Aug. 25, 2006

(65) Prior Publication Data

US 2008/0049903 A1 Feb. 28, 2008

(51) Int. Cl.
*H01J 31/49* (2006.01)

(52) U.S. Cl. .................................................. 378/189

(58) Field of Classification Search ................ 378/98.8, 378/167, 189, 204; 250/370.08, 370.09
See application file for complete search history.

(56) References Cited

U.S. PATENT DOCUMENTS

2002/0014594 A1* 2/2002 Endo ................. 250/370.09
2004/0227096 A1* 11/2004 Yagi ................. 250/370.09

* cited by examiner

*Primary Examiner*—Courtney Thomas
(74) *Attorney, Agent, or Firm*—Peter Vogel, Esq.; Michael G. Smith, Esq.

(57) ABSTRACT

Systems, methods and apparatus are provided through which a bin that is operable to store digital X-ray detectors includes one or more shock absorbers on the inside of the digital X-ray detector storage bin.

23 Claims, 11 Drawing Sheets

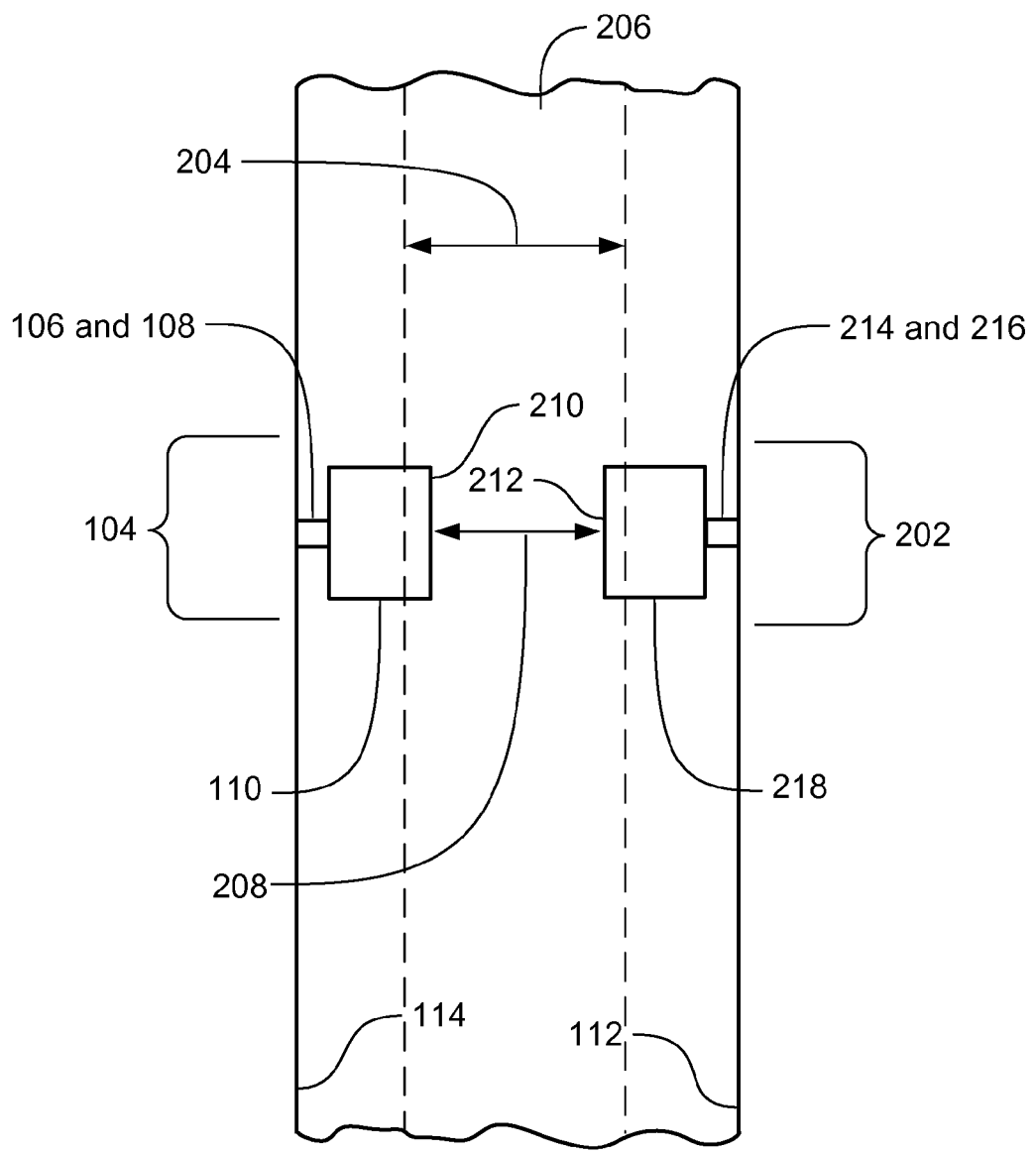
FIG. 2
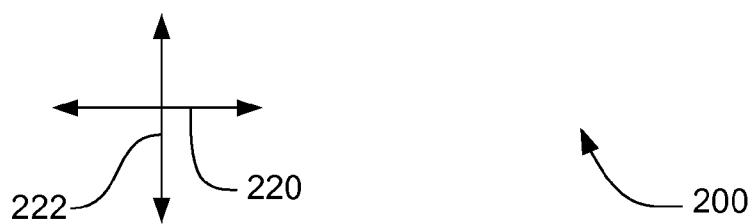

SYSTEMS, METHODS AND APPARATUS FOR A LATCHLESS X-RAY DETECTOR BIN

FIELD OF THE INVENTION

This invention relates generally to storage apparatus, and more particularly to X-ray detector storage bins.

BACKGROUND OF THE INVENTION

Digital X-ray detectors are very expensive pieces of equipment that require gently storage and handling. Conventional apparatus for storing digital X-ray detectors include a digital X-ray detector storage bin that is attached or mounted to the outside of a digital X-ray machine. The digital X-ray detector storage bins often include a door on the top of the digital X-ray detector storage bin. The door is opened to place a digital X-ray detector in the digital X-ray detector storage bin, and then closed again after the digital X-ray detector is placed in the digital X-ray detector storage bin.

The doors on the digital X-ray detector bins are greatly problematic. One problem with the door on the digital X-ray detectors is difficulty in manufacturing the doors. The doors include a latch and a striker. The latch is screwed on to the sheet metal frame of the digital X-ray detector storage bin. During manufacturing, if the screw is torqued too much, the latch will not open, the latch will not engage. Thus, the operability of the door and the latch is dependent upon the skill of assembly operator. In addition, the latch includes a number of spacers and washers to provide proper spacing for alignment during opening and closing of the door, which increases manufacturing complexity.

In addition, the door of the digital X-ray detector storage bin receives a considerable amount of physical abuse. The digital X-ray detector storage bin is typically located about 2.5 feet above the ground, about knee-height. Quite often, the door is operated (opened and closed) through contact with the knee of a medical technician. Opening and closing the door with a knee tends to be more forceful than operating the door by a hand, which results in a substantial amount of force being applied to the door, which has a deleterious effect on the door, leading to damage to the door much earlier than expected. All conventional digital X-ray detector storage bin door designs seem to be susceptible to premature wear-and-tear. Premature wear-and-tear is a particularly acute problem for X-ray systems associated with emergency rooms, where the fast pace of the workers exacerbates the excessive force placed on the digital X-ray detector storage bin doors.

Another problem with the doors is expediency. The process of opening the door takes time. Often, the operators of the X-ray equipment feel pressed for time, which in turn causes the operators to open the doors and close the doors rapidly and roughly.

Furthermore, when the digital X-ray detector storage bin door is not moved to a closed position by the operator, the door drops onto hard stops when opened, causing noise, and wear on the system. Placing the detector in the digital X-ray detector storage bin also requires two hands or a hand and a knee, one to hold the door open, and the other to place the detector in the digital X-ray detector storage bin. In fast-paced healthcare environments, the time and attention that is required to place the detector in the digital X-ray detector storage bin seems bothersome.

Further yet, in conventional digital X-ray detector storage bin designs, the latch and the latch mechanisms includes a number of screws, which are in close proximity to location of the detector in the digital X-ray detector storage bin. When the detector is placed in the digital X-ray detector storage bin, the detectors passes by screws, the detector is frequently scratched by the screws and other parts the latch mechanism. The screws and the latch mechanism are also somewhat unsightly.

In addition, conventional digital X-ray detector bins have a hard rubber stopper mounted on the horizontal (i.e. bottom) inside surface of the digital X-ray detector storage bin. Digital X-ray detectors have been damaged when place abruptly in the digital X-ray detector storage bin and having made forceful contact with the hard rubber bumpers.

For the reasons stated above, and for other reasons stated below which will become apparent to those skilled in the art upon reading and understanding the present specification, there is a need in the art for a system or apparatus that reduces the problems of digital X-ray detector storage bins such as the susceptibility to wear and tear and manufacturing defects of the doors. There is also a need for faster operation of the digital X-ray detector storage bin doors. This is a further need to reduce damage to the detectors by the digital X-ray detector storage bin door latch and a need to reduce forceful contact of the detectors with the hard rubber bumpers.

BRIEF DESCRIPTION OF THE INVENTION

The above-mentioned shortcomings, disadvantages and problems are addressed herein, which will be understood by reading and studying the following specification.

In one aspect, an apparatus to store a digital X-ray detector includes a digital X-ray detector storage bin having at a plurality of interior surfaces and one or more shock absorbers mounted to one or more of the interior surfaces of the digital X-ray detector storage bin. The shock absorber(s) press any item inserted into the digital X-ray detector storage bin against a surface inside the digital X-ray detector storage bin, which eliminates the need for a door on the digital X-ray detector storage bin.

In a further aspect, the weight of the digital X-ray detector compresses spring steel guides on the sides of the digital X-ray detector storage bin. The compressed springs would hold the digital X-ray detector in place in the horizontal planes without restricting motion vertically. The springs have a secondary benefit of dampening vibration.

Apparatus, systems, and methods of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 2 is a cross section top-view block diagram of a digital X-ray detector storage bin according to an embodiment having two opposing vertical surface, each surface having at least one spring guide;

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into four sections. In the first section, a system level overview is described. In the second section, apparatus of embodiments are described. In the third section, embodiments of methods are described. Finally, in the fourth section, a conclusion of the detailed description is provided.

System Level Overview

Figure 1:
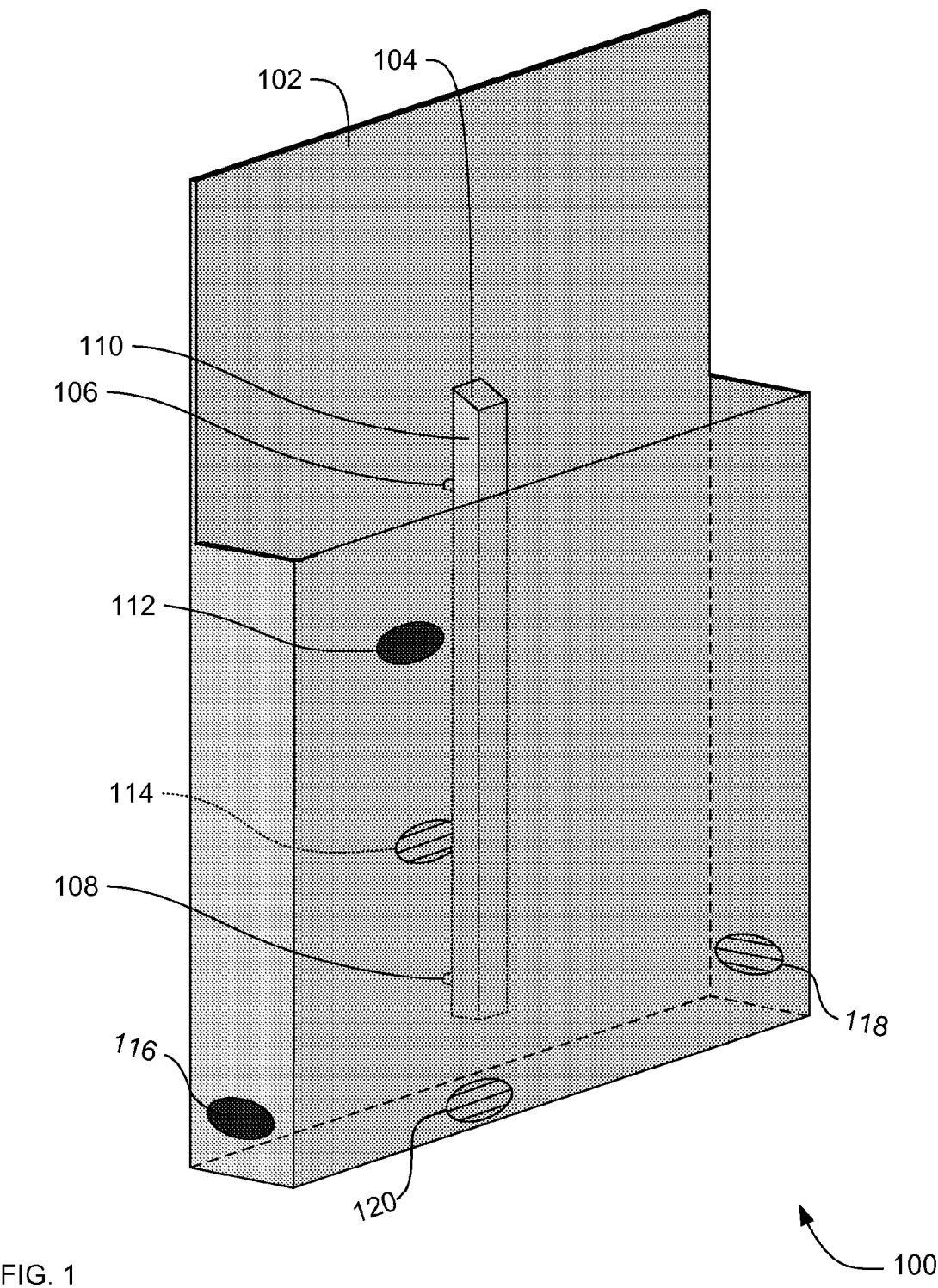
FIG. 1 is an isometric block diagram of an overview of an apparatus to store a digital X-ray detector.

FIG. 1 is an isometric block diagram of an overview of an apparatus to store a digital X-ray detector. Apparatus 100 solves the need in the art to reduce the numerous problems with the doors of the digital X-ray detector bins by eliminating the need for the doors.

Apparatus 100 includes one or more shock absorbers, such as spring guide 104. The shock absorbers include spring members 106 and 108 a main member 110. The spring members 106 and 108 are operably coupled to at least one of the plurality of interior surfaces of the digital X-ray detector storage bin 102. The spring members 106 and 108 press the main member 110 of the shock absorber away from the interior surface of the digital X-ray detector storage bin 102. Some embodiments of the spring members 106 and 108, have a size/load of 5 lbs and a 1 inch free length with 0.4 inch compression.

The one or more shock absorbers 114 that eliminates or reduces the need for a door in turns solves the need in the art for apparatus that reduces the susceptibility to wear and tear on the doors.

In embodiments where the digital X-ray detector storage bin does not include a door, the shock absorber(s) reduces manufacturing defects of the doors, provides faster operation of the digital X-ray detector storage bin doors, the shock absorber(s) reduces damage to the detectors by the digital X-ray detector storage bin door latch by completing eliminating the need for a door. By eliminating the need for a door on a digital X-ray detector storage bin 102, apparatus 100 is a paradigm shift in the retention of an X-ray detector in the digital X-ray detector storage bin 102.

Figure 13:
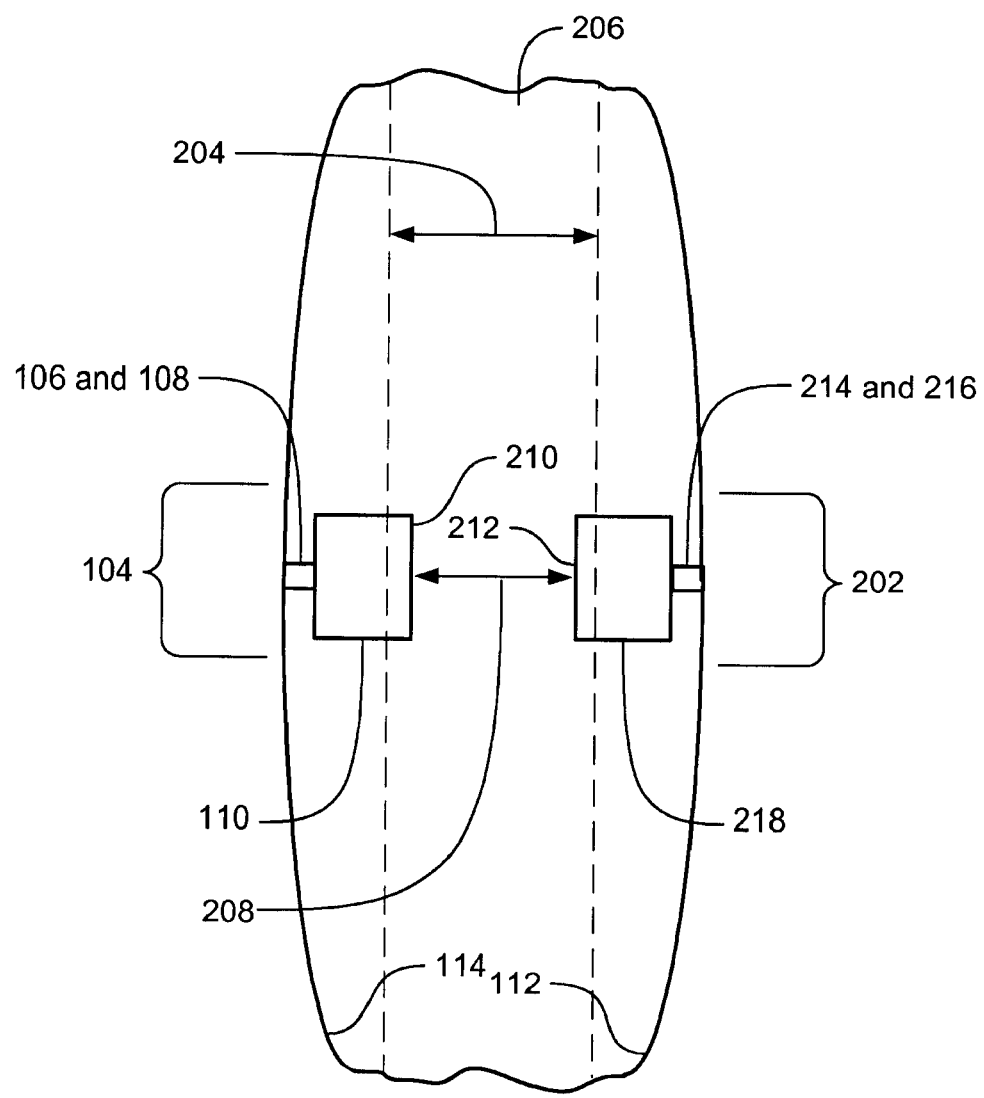
FIG. 13 is a block diagram of a side view of a digital X-ray detector storage bin having a concave interior.

Any number of shock absorber(s) can be fixedly attached to any one of the plurality of interior surfaces, such as vertical interior surface 112, vertical interior surface 114, vertical interior surface 116, vertical interior surface 118 and horizontal interior surface 120. In some embodiments, portions or all of the interior surface, shock absorber and digital X-ray detector storage bin, are manufactured of wear resistant, low coefficient of fricction material (eg. Nylon, derlin, . . . ) to facilitate inserting and withdrawing the detector. Some embodiments of the digital X-ray detctor storage bin 102 have a concave interior, such as shown in FIG. 13 below.

The system level overview of the operation of an embodiment is described in this section of the detailed description.

While the apparatus 100 is not limited to any particular interior surface, shock absorber and digital X-ray detector storage bin, for sake of clarity, simplified interior surfaces, shock absorber and digital X-ray detector storage bin is described. The location, number and specifications of the shock absorbers are not limited to the depiction(s) shown in the written description herein or any of the figures.

Apparatus Embodiments

In the previous section, a system level overview of the operation of an embodiment was described. In this section, the particular apparatus of such an embodiment are described by reference to a series of diagrams.

FIG. 2 is a cross section top-view block diagram of a digital X-ray detector storage bin 200 according to an embodiment having two opposing vertical surface, each surface having at least one spring guide. The digital X-ray detector storage bin 200 solves the need in the art to reduce the numerous problems with the doors of the digital X-ray detector bins by eliminating the need for the doors.

In the digital X-ray detector storage bin 200, shock absorbers (such as 104 and 202) are mounted on a vertical interior surface of the digital X-ray detector storage bin (such as 112 and 114). If the width 204 of an item 206 that is placed in the digital X-ray detector storage bin 200 is less then the amount of space 208 between a face 210 of the shock absorber 104 and an opposing face 212 of a shock absorber 202 mounted on the opposing facing vertical surface, such as 112, the spring members (such as 214 and 216), of the shock absorber 202 are compressed away from the opposing vertical interior surfaces (such as 114 and 112). Digital X-ray detectors are typically less than 1" wide, so in one embodiment, the space 208 between a face 210 of the shock absorber 104 and an opposing face 212 of a shock absorber 202 is less than 1". This compression also provides a force of the main members (such as 110 and 218) toward the item 206. The force restricts movement of the item 206 in all directions vertically, lateral 220 and longitudinally 222. Static friction between the item 206 and the faces (such as 210 and 212) restricts longitudinal 222 movement of the item 206.

In regards to the size of the digital X-ray detectors, more specific dimensions of some digital X-ray detectors are 465 mm×585.00 mm×24.00 mm.

For example, when a digital X-ray detector (or any other item 206) is placed in the digital X-ray detector storage bin 102 wherein the width 204 of the detector is less then the amount of space 212 between the main member 108 of the spring guide 110 and the opposing vertical surface 112 or a shock absorber 218, the spring guide 110 presses toward the opposing vertical surface 112, thus restricting movement of the detector 206 in all directions vertically, lateral 220 and longitudinally 222. Thus, the shock absorbers 110 and 218 with spring members 106, 108, 214 and 216 provide a means to retain the detector 206 in the digital X-ray detector storage bin 102, which reduces and/or eliminates the need for a door on the top of the digital X-ray detector storage bin 102 to retain the detector 206 in the digital X-ray detector storage bin 102, which in turn reduces or eliminates the need for a door.

The spring guides 110 and 218 provide for transportation with, or without the grid on the detector, as the compression of the springs compensates for the change in width of the detector.

Figure 3:
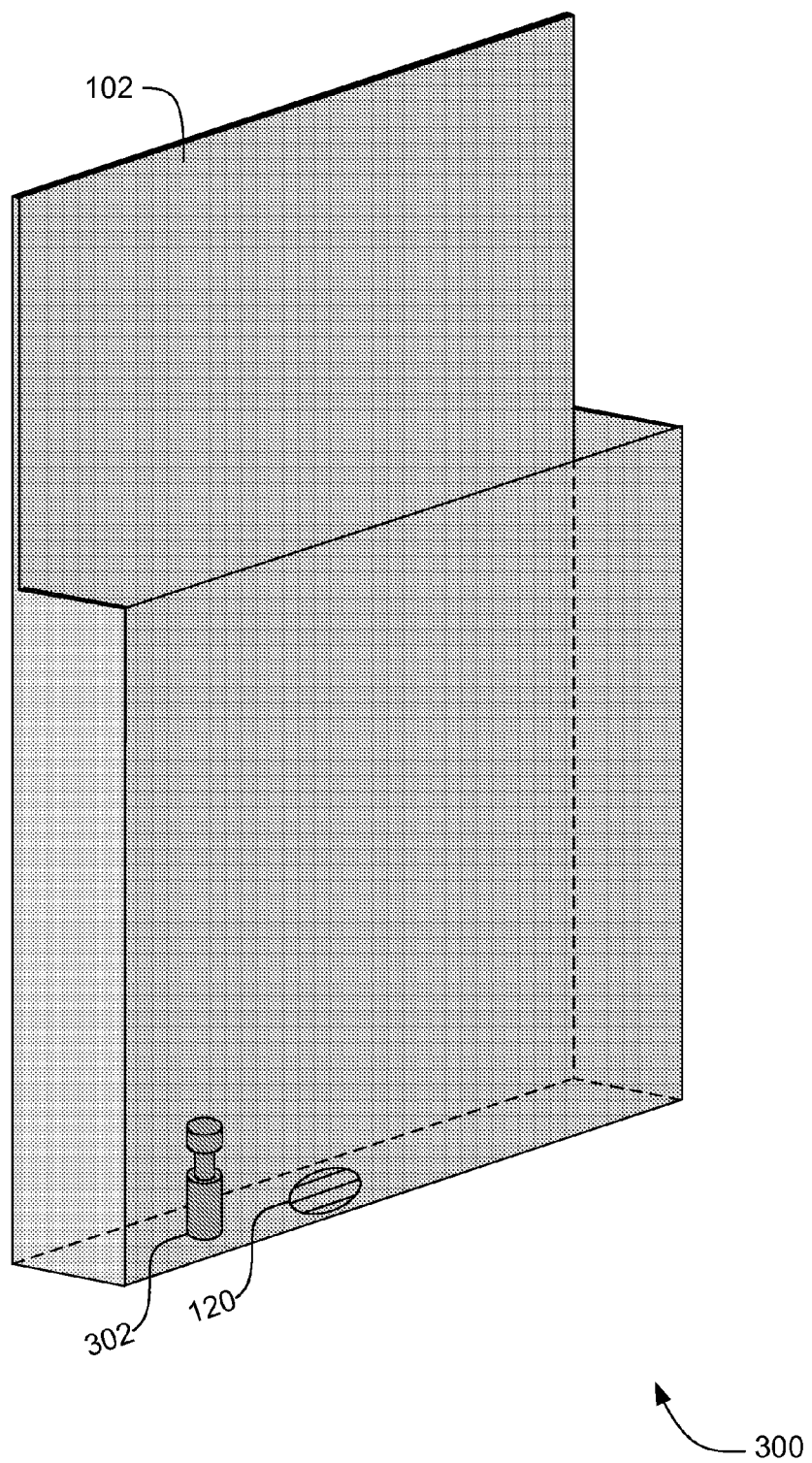
FIG. 3 is an isometric block diagram of a digital X-ray detector storage bin according to an embodiment that has at least one shock absorber on the horizontal interior surface of the digital X-ray detector storage bin.

FIG. 3 is an isometric block diagram of a digital X-ray detector storage bin 300 according to an embodiment that has at least one shock absorber on the horizontal interior surface of the digital X-ray detector storage bin. The digital X-ray detector storage bin 300 solves the need in the art to reduce forceful contact of the detectors with the hard rubber bumpers in the digital X-ray detector storage bins.

The digital X-ray detector storage bin 300 includes at least one shock absorber 302 that is operably coupled, fixed and/or mounted to the at least one horizontal interior surface 120 of the digital X-ray detector storage bin.

In the embodiment shown in FIG. 3, the shock absorber 302 is a damper or a vibration damper. In some embodiments of the damper 302, the damper has a 1.00 inch stroke and 80-100 lbs. capacity.

Figure 4:
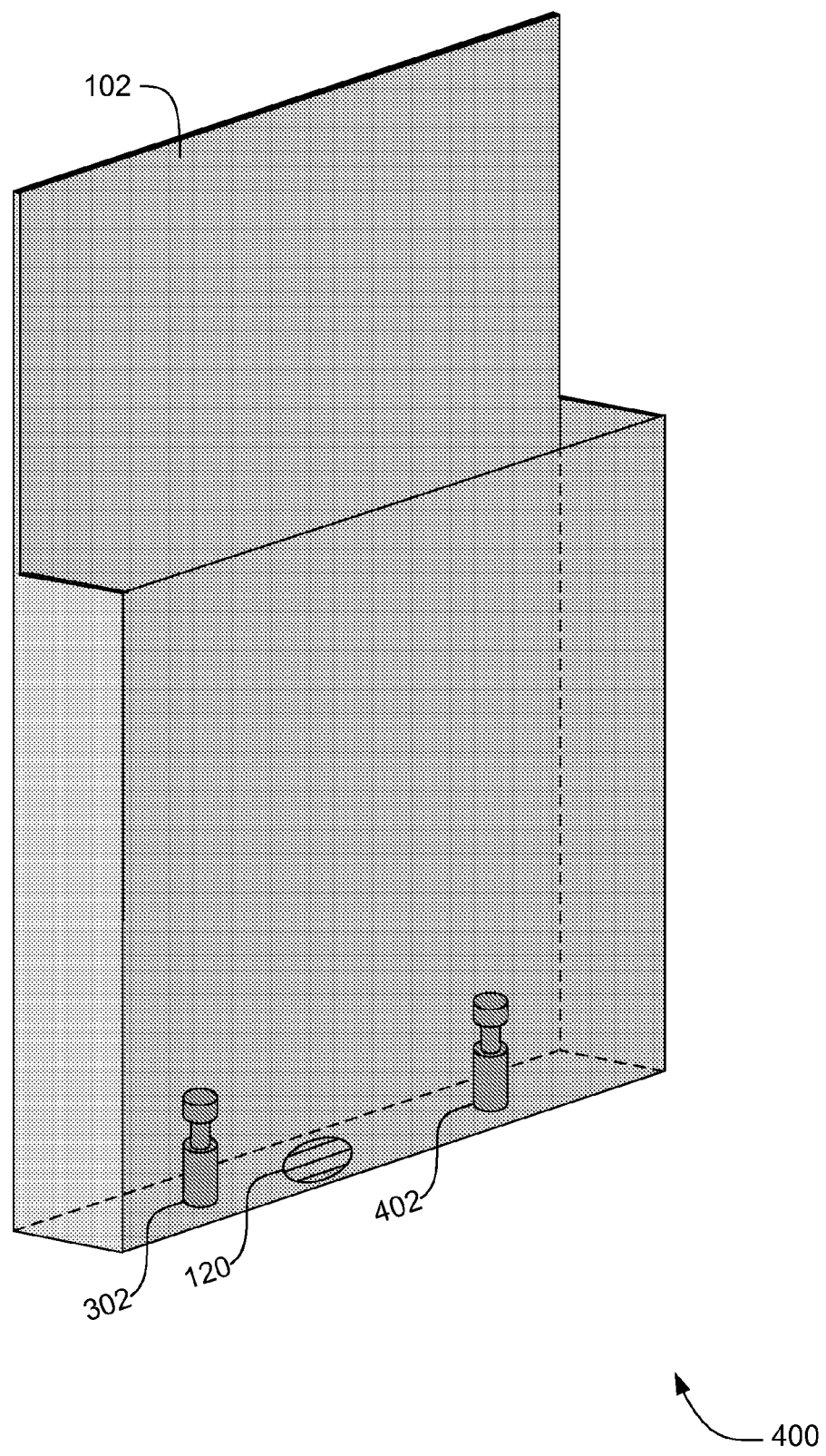
FIG. 4 is an isometric block diagram of a digital X-ray detector storage bin according to an embodiment that includes a plurality of shock absorbers on the horizontal interior surface of the digital X-ray detector storage bin.

FIG. 4 is an isometric block diagram of a digital X-ray detector storage bin 400 according to an embodiment that includes a plurality of shock absorbers on the horizontal interior surface of the digital X-ray detector storage bin. The digital X-ray detector storage bin 400 solves the need in the art to reduce forceful contact of the detectors with the hard rubber bumpers in the digital X-ray detector storage bins.

The digital X-ray detector storage bin 400 includes a plurality of shock absorbers, such as 302 and 402, that are operably, coupled, fixed and/or mounted to the horizontal interior surface 120 of the digital X-ray detector storage bin 102. In the embodiment shown in FIG. 5, shock absorbers 302 and 402 are dampers.

Figure 5:
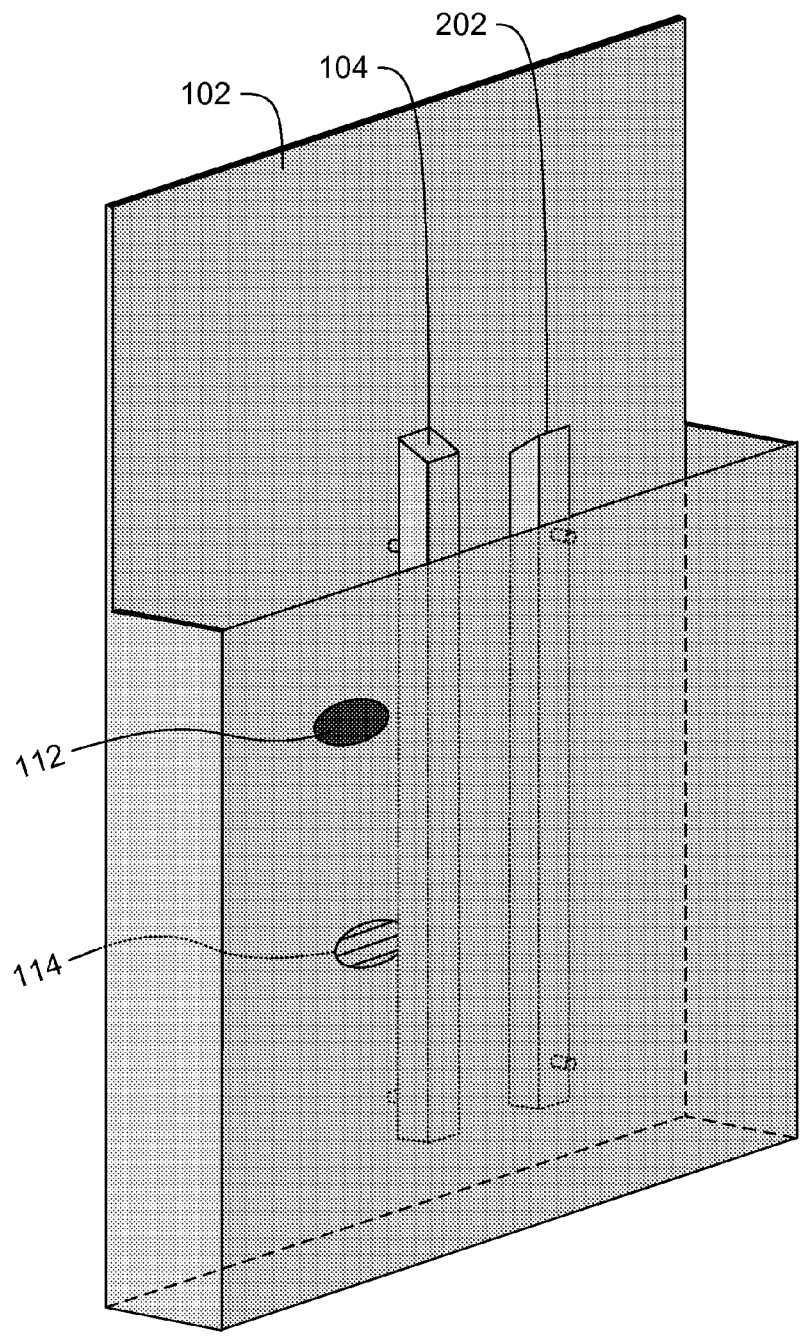
FIG. 5 is an isometric block diagram of a digital X-ray detector storage bin according to an embodiment that includes one or more shock absorbers on vertical interior surfaces of the digital X-ray detector storage bin.

FIG. 5 is an isometric block diagram of a digital X-ray detector storage bin 500 according to an embodiment that includes one or more shock absorbers on vertical interior surfaces of the digital X-ray detector storage bin. The digital X-ray detector storage bin 500 solves the need in the art to reduce the numerous problems with the doors of the digital X-ray detector bins by eliminating the need for the doors.

The digital X-ray detector storage bin 500 includes a plurality of shock absorbers, such as 104 and 202, that are operably, coupled, fixed and/or mounted to the vertical interior surfaces 114 and 112 respectively of the digital X-ray detector storage bin 102. In the embodiment shown in FIG. 5, shock absorbers 104 and 202 are spring guides.

Figure 6:
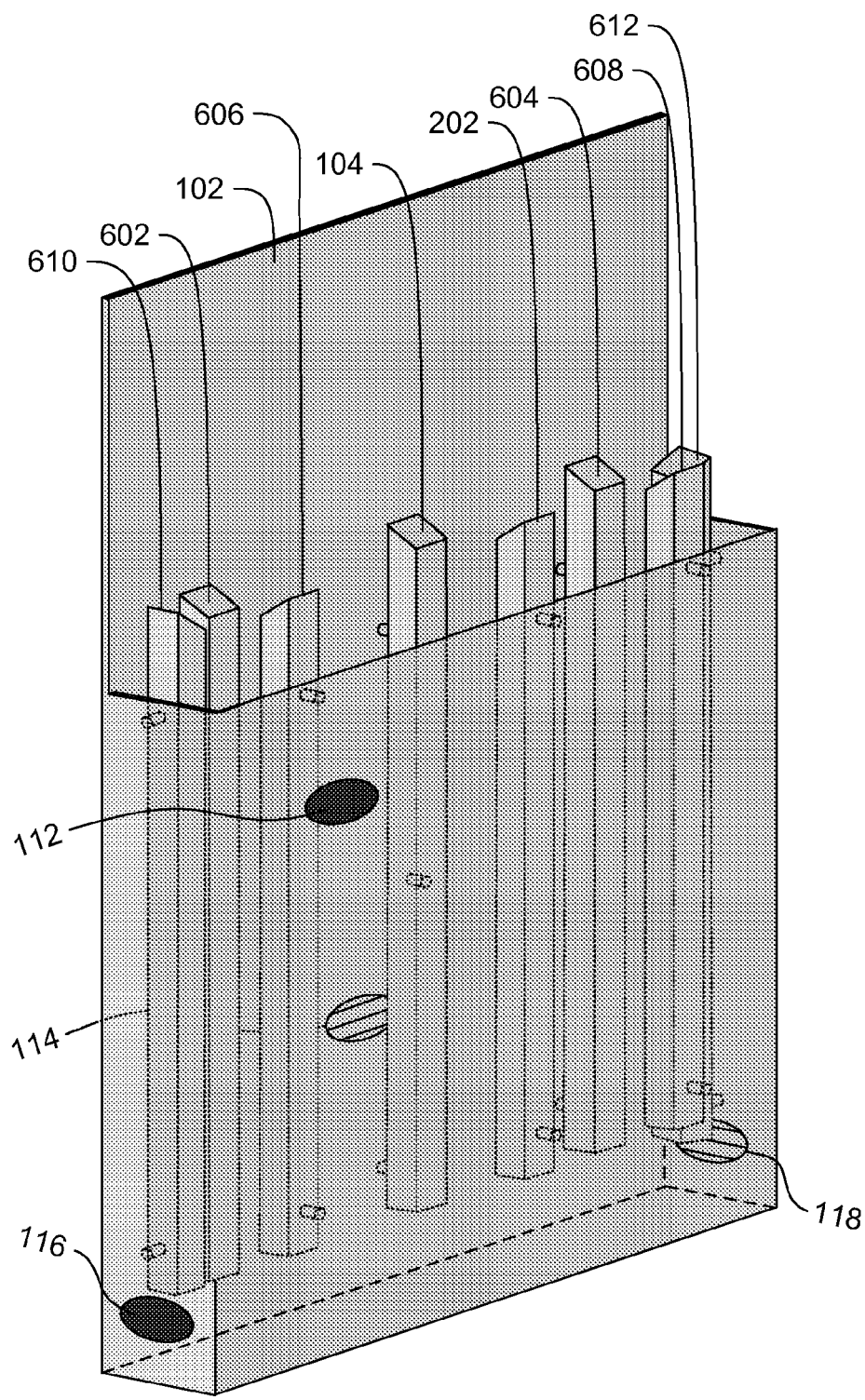
FIG. 6 is an isometric block diagram of a digital X-ray detector storage bin according to an embodiment that includes eight shock absorbers on vertical interior surfaces of the digital X-ray detector storage bin.

FIG. 6 is an isometric block diagram of a digital X-ray detector storage bin 600 according to an embodiment that includes eight shock absorbers on vertical interior surfaces of the digital X-ray detector storage bin. The digital X-ray detector storage bin 600 solves the need in the art to reduce the numerous problems with the doors of the digital X-ray detector bins by eliminating the need for the doors.

The digital X-ray detector storage bin 600 includes a first vertical interior surface 112, a second vertical interior surface 114, a third vertical interior surface 116 and a fourth vertical interior surface 118. The digital X-ray detector storage bin 600 also includes eight spring guides, three of the spring guides, such as 104, 602 and 604, are operably coupled to the first vertical interior surface 112. Three of the spring guides, such as 202, 606 and 608 are operably coupled to the second vertical interior surface 114. One of the spring guides, such as 610, is operably coupled to the third vertical interior surface, such as 116. One of the spring guides, such as 612, is operably coupled to the fourth vertical interior surface, such as 118.

In the digital X-ray detector storage bin 600, if the width of an item that is placed in the digital X-ray detector storage bin is less then the amount of space between faces of the spring guides 104, 602 and 604 and an opposing face of spring guides 202, 606 and 608 respectively that are mounted on the opposing facing vertical surface, the spring members of the spring guides are compressed away from the opposing vertical interior surfaces 114 and 112. This compression also provides a force of the main members of the spring guides toward the item. The force restricts movement of the item in all directions vertically, laterally 220 and longitudinally 222. Static friction between the item and the faces restricts longitudinal 222 movement of the item.

In the digital X-ray detector storage bin 600, if the length of an item that is placed in the digital X-ray detector storage bin is less then the amount of space between faces of the spring guide 610 and an opposing face of spring guide 612 that are mounted on the opposing facing vertical surface, the spring members of the spring guides are compressed away from the opposing vertical interior surfaces 116 and 118. This compression also provides a force of the main members of the spring guides toward the item. The force restricts movement of the item in all directions vertically, laterally 220 and longitudinally 222. Static friction between the item and the faces restricts lateral 220 movement of the item.

Figure 7:
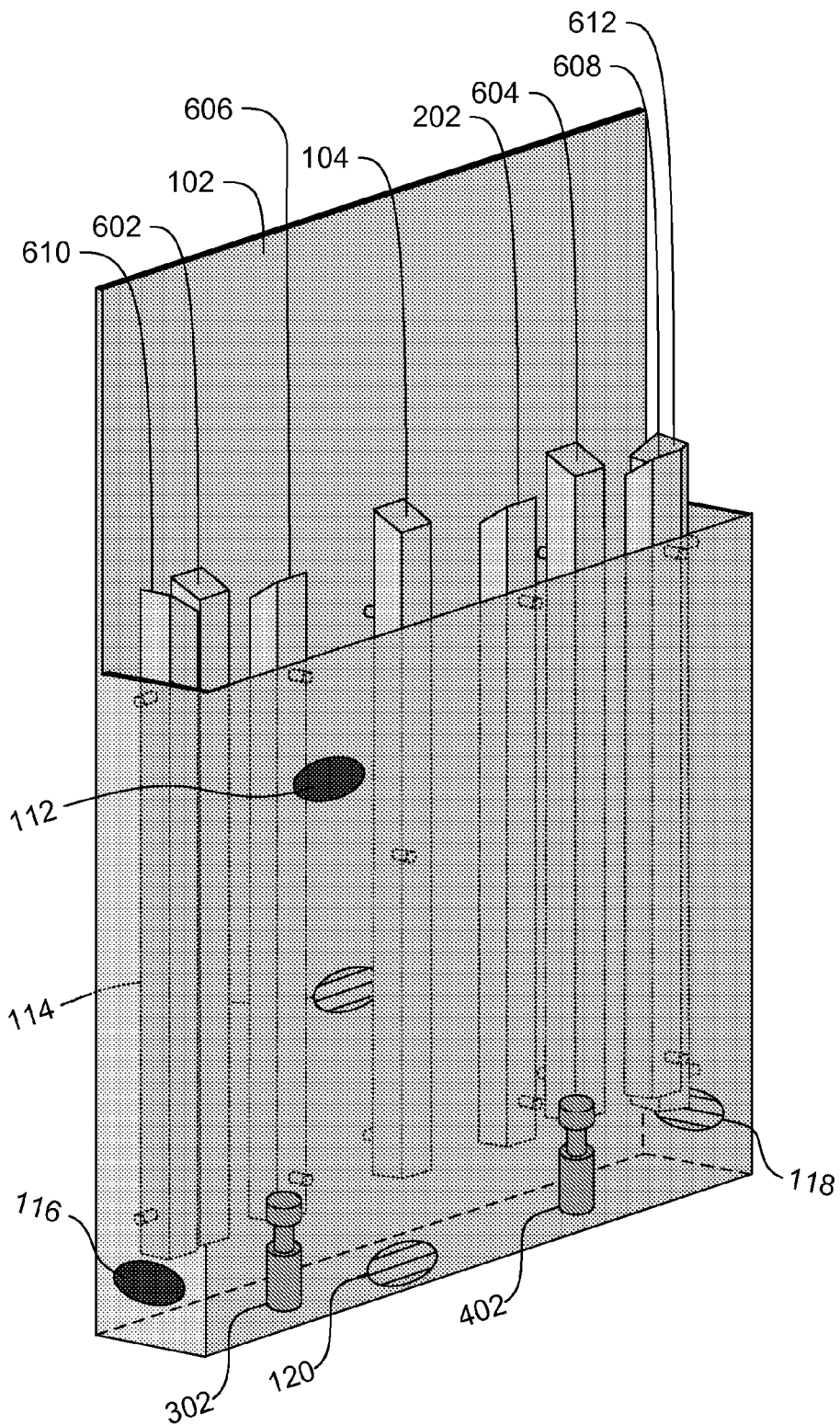
FIG. 7 is an isometric block diagram of a digital X-ray detector storage bin according to an embodiment that includes eight shock absorbers on vertical interior surfaces of the digital X-ray detector storage bin and one or more shock absorbers on the horizontal interior surface of the digital X-ray detector storage bin.

FIG. 7 is an isometric block diagram of a digital X-ray detector storage bin 700 according to an embodiment that includes eight shock absorbers on vertical interior surfaces of the digital X-ray detector storage bin and one or more shock absorbers on the horizontal interior surface of the digital X-ray detector storage bin. The digital X-ray detector storage bin 700 solves the need in the art to reduce the numerous problems with the doors of the digital X-ray detector bins by eliminating the need for the doors.

The digital X-ray detector storage bin 700 includes all aspects of FIGS. 1-6.

Figure 8:
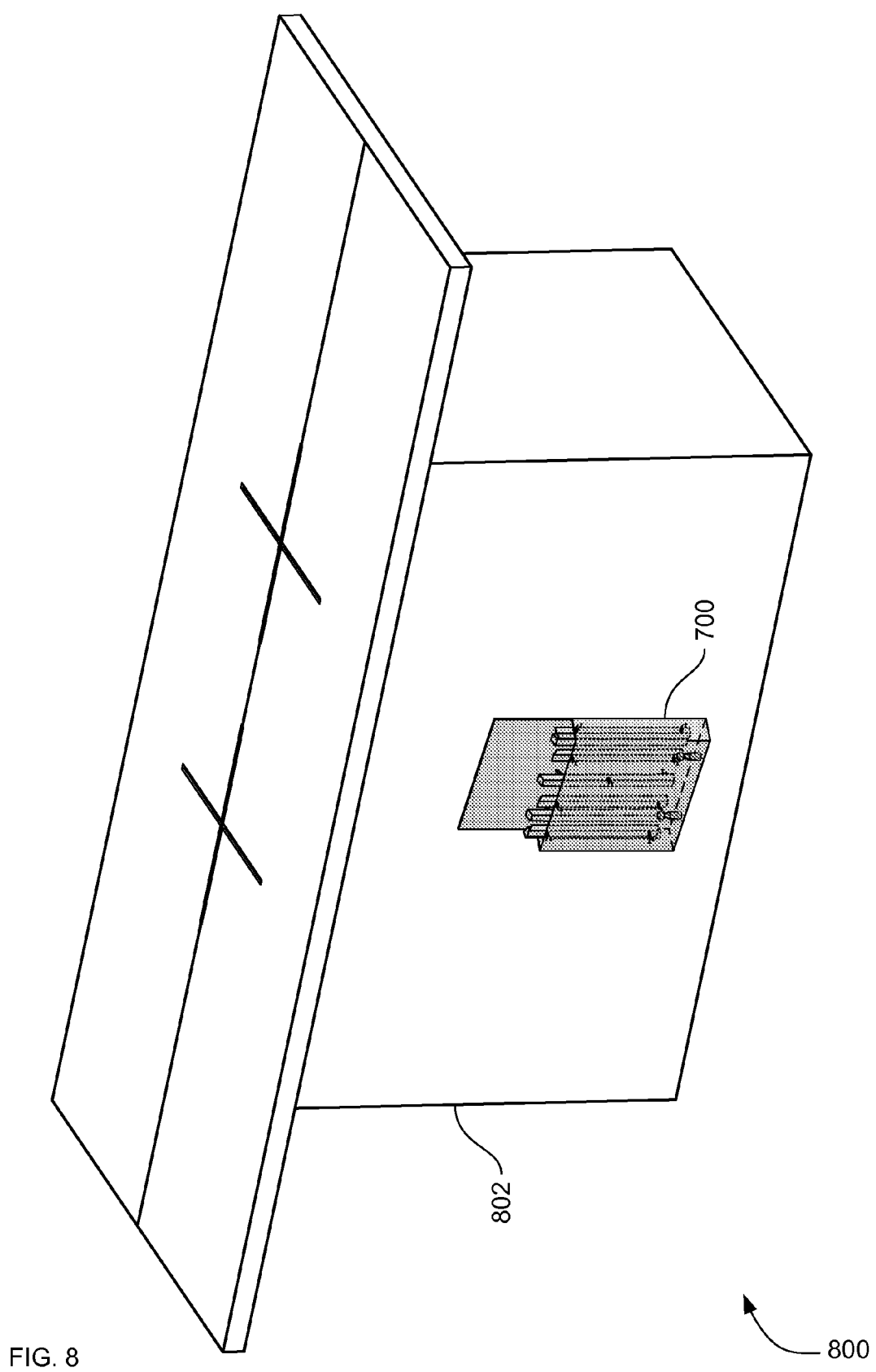
FIG. 8 is an isometric block diagram of apparatus according to an embodiment that includes an X-ray table and a digital X-ray detector storage bin.

FIG. 8 is an isometric block diagram of apparatus 800 according to an embodiment that includes an X-ray table and a digital X-ray detector storage bin. The digital X-ray detector storage bin 800 solves the need in the art to reduce the numerous problems with the doors of the digital X-ray detector bins by eliminating the need for the doors.

The digital X-ray detector storage bin 800 includes an X-ray table 802 and a digital X-ray detector storage bin 700 of FIG. 7.

Figure 9:
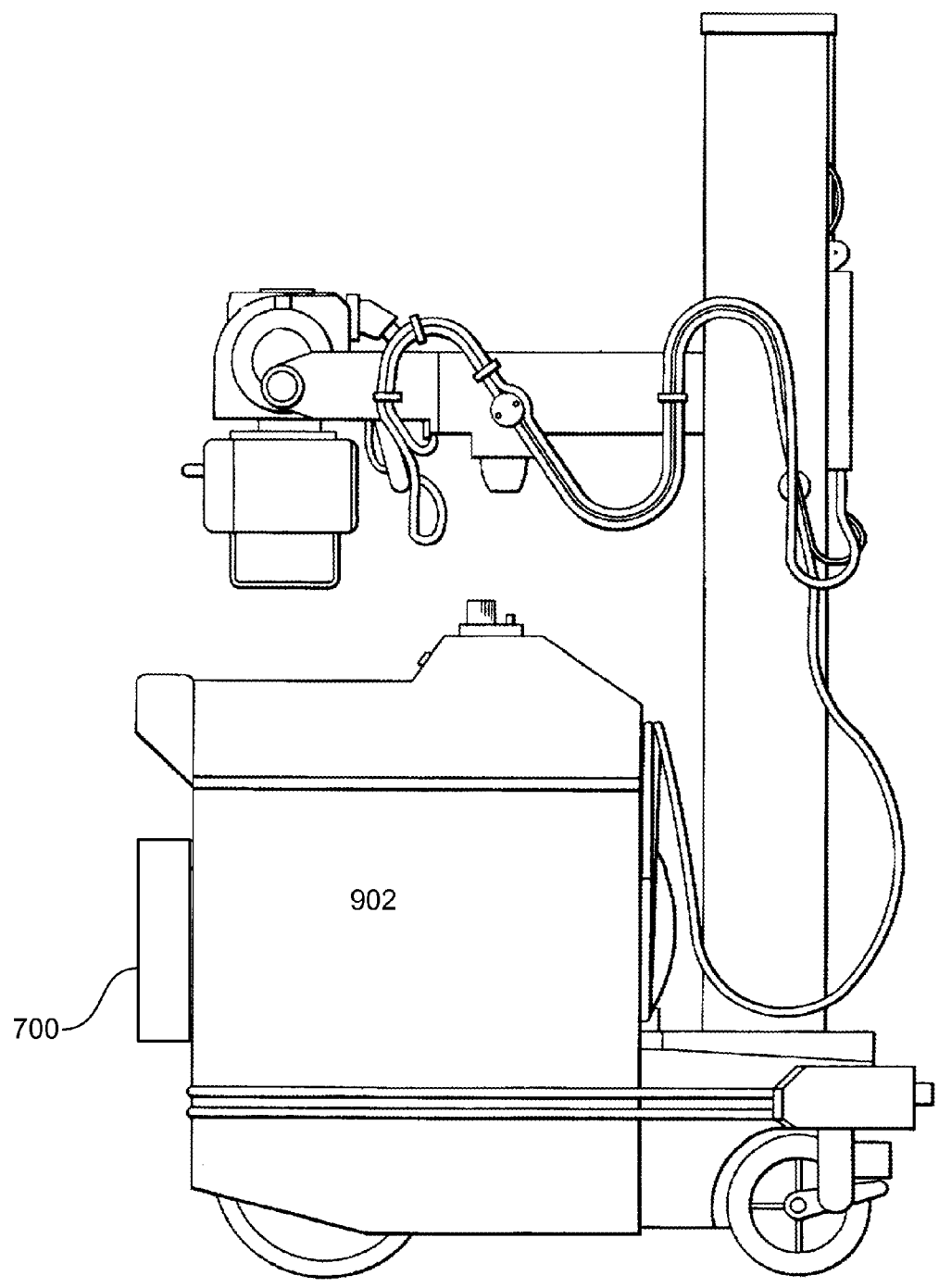
FIG. 9 is an isometric block diagram of a mobile X-ray system according to an embodiment that includes a digital X-ray detector storage bin.

FIG. 9 is an isometric block diagram of a mobile X-ray system 900 according to an embodiment that includes a digital X-ray detector storage bin. The mobile X-ray system 900 solves the need in the art to reduce the numerous problems with the doors of the digital X-ray detector bins by eliminating the need for the doors.

Mobile X-ray system 900 includes a digital X-ray detector storage bin 700 of FIG. 7 that is attached to a base 902 of the mobile X-ray system 900.

Figure 12:
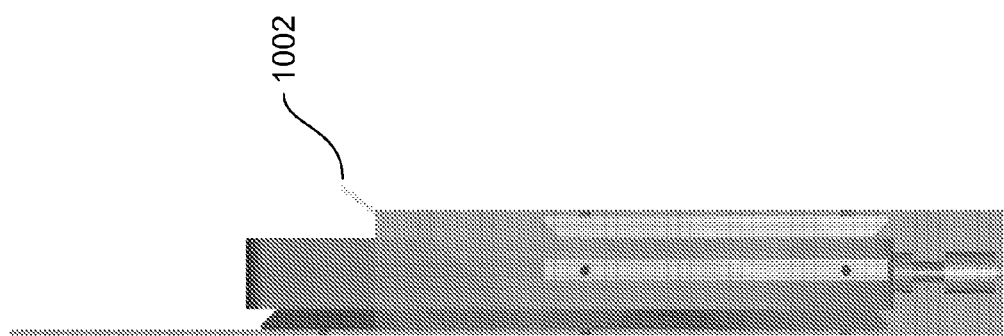
FIGS. 10-12 show a side view of a digital X-ray detector storage bin showing a digital X-ray detector being inserted and springs guides being compressed.
Figure 11:
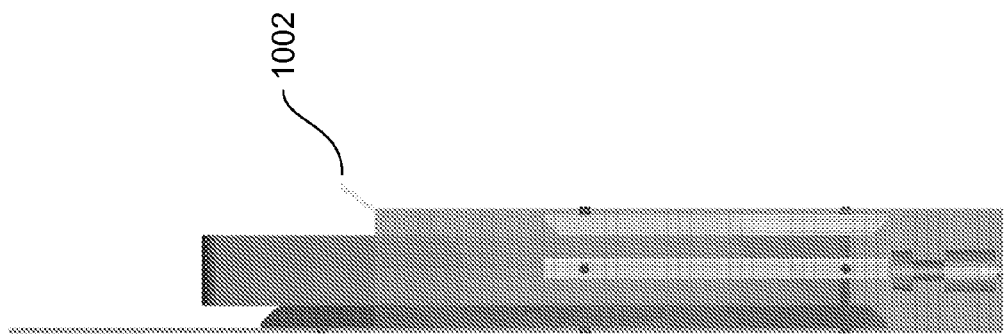
Figure 10:
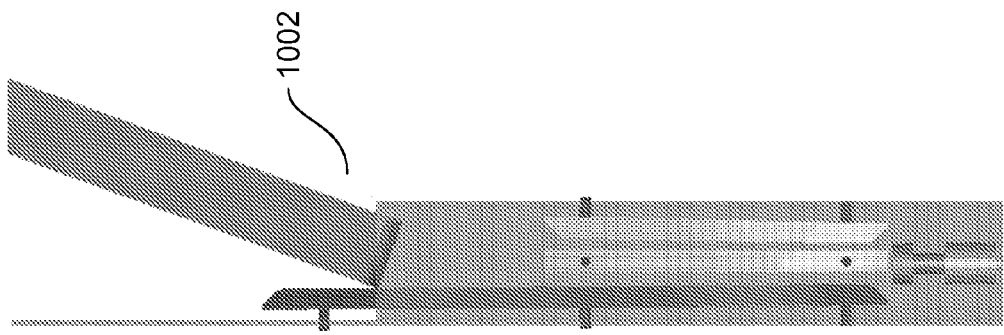

FIGS. 10-12 show a side view of a digital X-ray detector storage bin showing a digital X-ray detector being inserted and spring guides being compressed. The digital X-ray detector storage bin includes an angled opening 1002.

FIG. 13 is a block diagram of a cut-away of a side view of a digital X-ray detector storage bin 1300 having a concave interior.

Conclusion

A digital X-ray detector storage bin is described. In some embodiments, the digital X-ray detector storage bin allows the user to quickly insert and withdraw the detector from the digital XZ-ray system unit without having to open a door. The digital X-ray detector storage bin improves reliability of the system by eliminating 2 latches, 4 hinges and other hardware. In some embodiments, the digital X-ray detector storage bin positions two dampers in the vertical orientation at the bottom of the bin, improving the cushioning that the digital X-ray detector experiences when dropped in the bin. In some embodiments, the steel springs eliminates binding upon insertion into the bin (misalignment when the operator inserts the detector is compensated by the spring compression). In some embodiments, the spring guides reduce the impact experienced by the digital X-ray detector while being transported.

Although specific embodiments are illustrated and described herein, it will be appreciated by those of ordinary skill in the art that any arrangement which is calculated to achieve the same purpose may be substituted for the specific embodiments shown. This application is intended to cover any adaptations or variations.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future digital X-ray detector storage bins, different X-ray systems, and new digital X-ray detectors.

The terminology used in this application is meant to include environments and alternate technologies which provide the same functionality as described herein

I claim:

1. An apparatus to store a digital X-ray detector, the apparatus comprising:
    a digital X-ray detector storage bin having a plurality of interior surfaces; and
    at least one shock absorber operably coupled to at least one interior surface of the digital X-ray detector storage bin, wherein a first side of the digital X-ray detector storage bin is open, the first side having less area, as measured by length multiplied by width, than the area of each of a plurality of sides of the digital X-ray detector storage bin that are arranged at about a perpendicular angle to the first side.

2. The apparatus of claim 1, wherein the apparatus further comprises:
    not including a door on the top of the digital X-ray detector storage bin.

3. The apparatus of claim 1, wherein the plurality of interior surfaces further comprises a first vertical surface and a second vertical surface, the first vertical surface being positioned opposite and parallel to the second vertical surface and the at least one shock absorber further comprises a first spring guide and a second spring guide, each spring guide further comprising a main member fixedly attached to springs, and wherein the width of the digital X-ray detector is less then a distance between the main member of the each shock absorbers, the shock absorbers providing a force urging toward the opposing vertical surface, thus restricting movement of the digital X-ray detector in all directions vertically, lateral and longitudinally.

4. The apparatus of claim 1, wherein the at least one interior surface further comprises at least one horizontal interior surface and the at least one shock absorber further comprises:
    at least one shock absorber operably coupled to the at least one horizontal interior surface of the digital X-ray detector storage bin.

5. The apparatus of claim 1, wherein the at least one interior surface further comprises a horizontal interior surface and the at least one shock absorber further comprises:
    a plurality of shock absorbers operably coupled to the horizontal interior surface of the digital X-ray detector storage bin.

6. The apparatus of claim 1, wherein the at least one interior surface further comprises at least one horizontal interior surface and the at least one shock absorber further comprises:
    two shock absorbers operably coupled to the at least one horizontal interior surface of the digital X-ray detector storage bin.

7. The apparatus of claim 1, wherein the at least one interior surface further comprises at least one vertical interior surface and the at least one shock absorber further comprises:
    at least one spring guide operably coupled to at least one vertical interior surface of the digital X-ray detector storage bin.

8. The apparatus of claim 1, wherein the at least one interior surface further comprises at least one vertical interior surface and the at least one shock absorber further comprises:
    a plurality of spring guides operably coupled to at least one vertical interior surface of the digital X-ray detector storage bin.

9. The apparatus of claim 1, wherein the at least one interior surface further comprises at least one vertical interior surface and the at least one shock absorber further comprises:
    two spring guides operably coupled to at least one vertical interior surface of the digital X-ray detector storage bin.

10. The apparatus of claim 1, wherein the at least one interior surface further comprises four vertical interior surfaces and the at least one shock absorber further comprises:
    eight spring guides operably coupled to the four vertical interior surfaces of the digital X-ray detector storage bin.

11. The apparatus of claim 1, wherein the at least one interior surface further comprises a first vertical interior surface, a second vertical interior surface, a third vertical interior surface and a fourth vertical interior surface and the at least one shock absorber further comprises:
    eight spring guides, three of the spring guides operably coupled to the first vertical interior surface, three of the spring guides operably coupled to the second vertical interior surface, one of the spring guides operably coupled to the third vertical interior surface and one of the spring guides operably coupled to the fourth vertical interior surface.

12. The apparatus of claim 1, wherein
    the at least one interior surface further comprises a first set of two interior vertical surfaces and the at least one shock absorber further comprises three spring guides operably coupled to each of the first set of two vertical interior surfaces of the digital X-ray detector storage bin, and
    the at least one interior surface further comprises a second set of two interior vertical surfaces and the at least one shock absorber further comprises one spring guide operably coupled to each of the second set of two vertical interior surfaces of the digital X-ray detector storage bin.

13. The apparatus of claim 1,
    wherein the at least one interior surface further comprises a first set of two interior vertical surfaces and the at least one shock absorber further comprises three spring guides operably coupled to each of the first set of two vertical interior surfaces of the digital X-ray detector storage bin,
    wherein the at least one interior surface further comprises a second set of two interior vertical surfaces and the at least one shock absorber further comprises one spring guide operably coupled to each of the second set of two vertical interior surfaces of the digital X-ray detector storage bin, and
    wherein the at least one interior surface further comprises at least one horizontal interior surface and the at least one shock absorber further comprises two shock absorbers operably coupled to the at least one horizontal interior surface of the digital X-ray detector storage bin.

14. An apparatus to store a digital X-ray detector, the apparatus comprising:
a digital X-ray detector storage bin having a first set of two interior vertical surfaces, a second set of two interior vertical surfaces, and one horizontal interior surface;
three spring guides operably coupled to each of the first set of two vertical interior surfaces of the digital X-ray detector storage bin,
one spring guide operably coupled to each of the second set of two vertical interior surfaces of the digital X-ray detector storage bin, and
two shock absorbers operably coupled to the one horizontal interior surface of the digital X-ray detector storage bin.

15. The apparatus of claim 14 further comprising:
not including a door on the top of the digital X-ray detector storage bin.

16. An apparatus comprising:
an X-ray imaging system; and
a digital X-ray detector storage bin operably coupled to the X-ray imaging system, the digital X-ray detector storage bin having a concave interior, the digital X-ray detector storage bin not including a door.

17. The apparatus of claim 16, wherein the digital X-ray detector storage bin further comprises:
at least one shock absorber in the interior of the digital X-ray detector storage bin.

18. The apparatus of claim 17, wherein the at least one shock absorber further comprises:
at least one shock absorber operably coupled to a horizontal interior surface of the digital X-ray detector storage bin.

19. The apparatus of claim 17, wherein the at least one shock absorber further comprises:
a plurality of shock absorbers operably coupled to a horizontal interior surface of the digital X-ray detector storage bin.

20. The apparatus of claim 17, wherein the at least one shock absorber further comprises:
two shock absorbers operably coupled to a horizontal interior surface of the digital X-ray detector storage bin.

21. The apparatus of claim 17, wherein the at least one shock absorber further comprises:
at least one spring guide operably coupled to at least one vertical interior surface of the digital X-ray detector storage bin.

22. The apparatus of claim 17, wherein the at least one shock absorber further comprises:
a plurality of spring guides operably coupled to at least one vertical interior surface of the digital X-ray detector storage bin.

23. The apparatus of claim 17, wherein the at least one shock absorber further comprises:
two spring guides operably coupled to at least one vertical interior surface of the digital X-ray detector storage bin.

* * * * *